United States Patent
Bucholtz et al.

[11] 3,713,598
[45] Jan. 30, 1973

[54] WIRE GUIDE APPARATUS

[75] Inventors: Glen E. Bucholtz; James N. Doyle, both of Dayton, Ohio

[73] Assignee: The Globe Tool and Engineering Company, Dayton, Ohio

[22] Filed: Jan. 13, 1971

[21] Appl. No.: 106,176

[52] U.S. Cl............242/7.05 B, 29/205 CM, 29/597, 29/598, 242/7.03
[51] Int. Cl.............................................H02k 15/09
[58] Field of Search .......242/7.05 R, 7.05 B; 29/597, 29/598, 596, 205 CM; 310/234, 7.03

[56] References Cited

UNITED STATES PATENTS 3,474,515   10/1969   Dammar..............................29/205
3,506,864   4/1970   Miller..................................310/234

FOREIGN PATENTS OR APPLICATIONS 735,951   8/1955   Great Britain..................242/7.05 B

*Primary Examiner*—Billy S. Taylor
*Attorney*—Dybvig & Dybvig

[57] ABSTRACT

A double flier armature winding machine is provided with wire guides mounted upon the winding forms and cooperating with a shielding device to cause the wires used in winding the armature to be coursed over the proper commutator hooks.

Two embodiments are shown, one in which the wire guides are spring biased and one in which the wire guides are positively driven by mechanical means into straddling relation with the commutator hooks.

5 Claims, 8 Drawing Figures

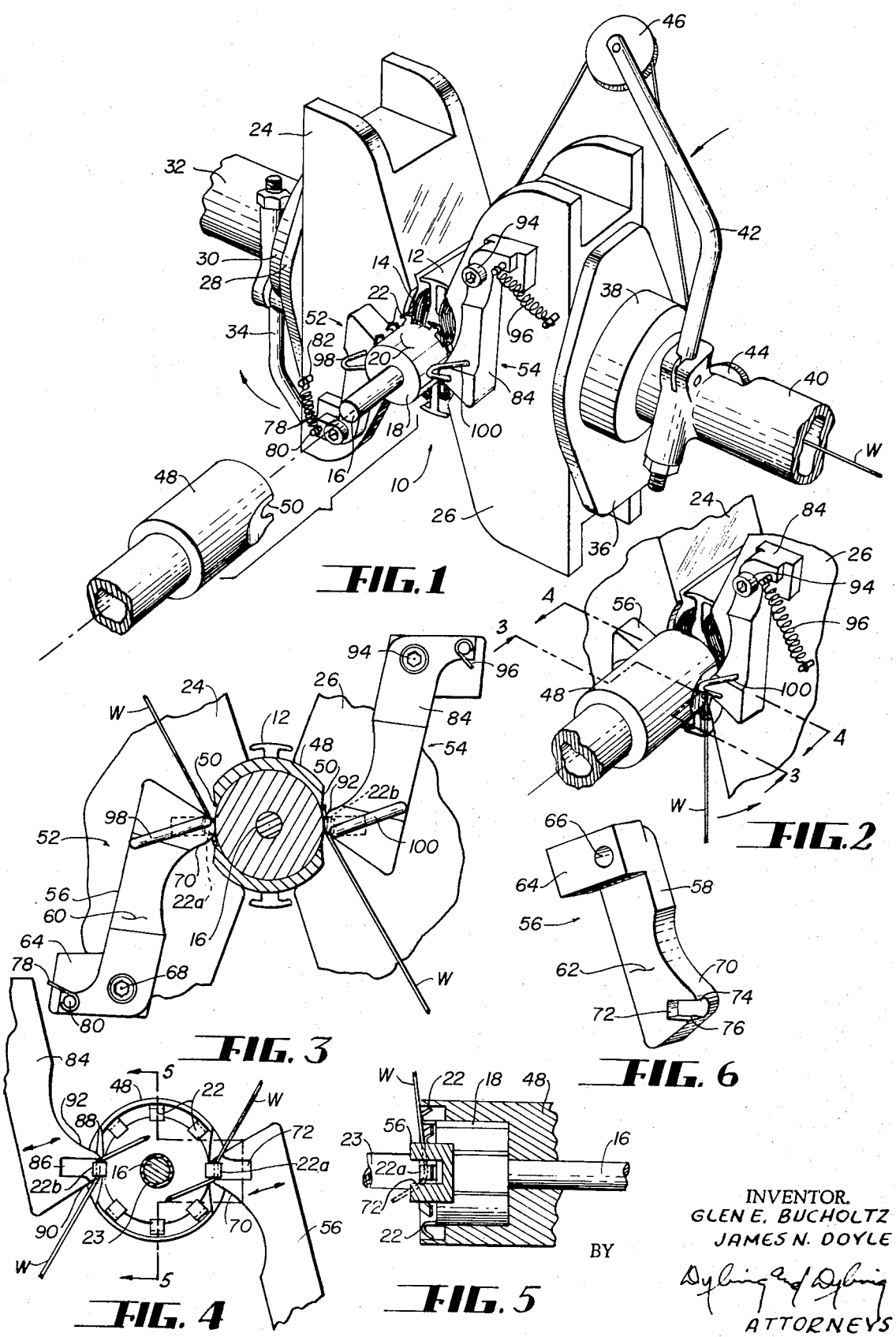

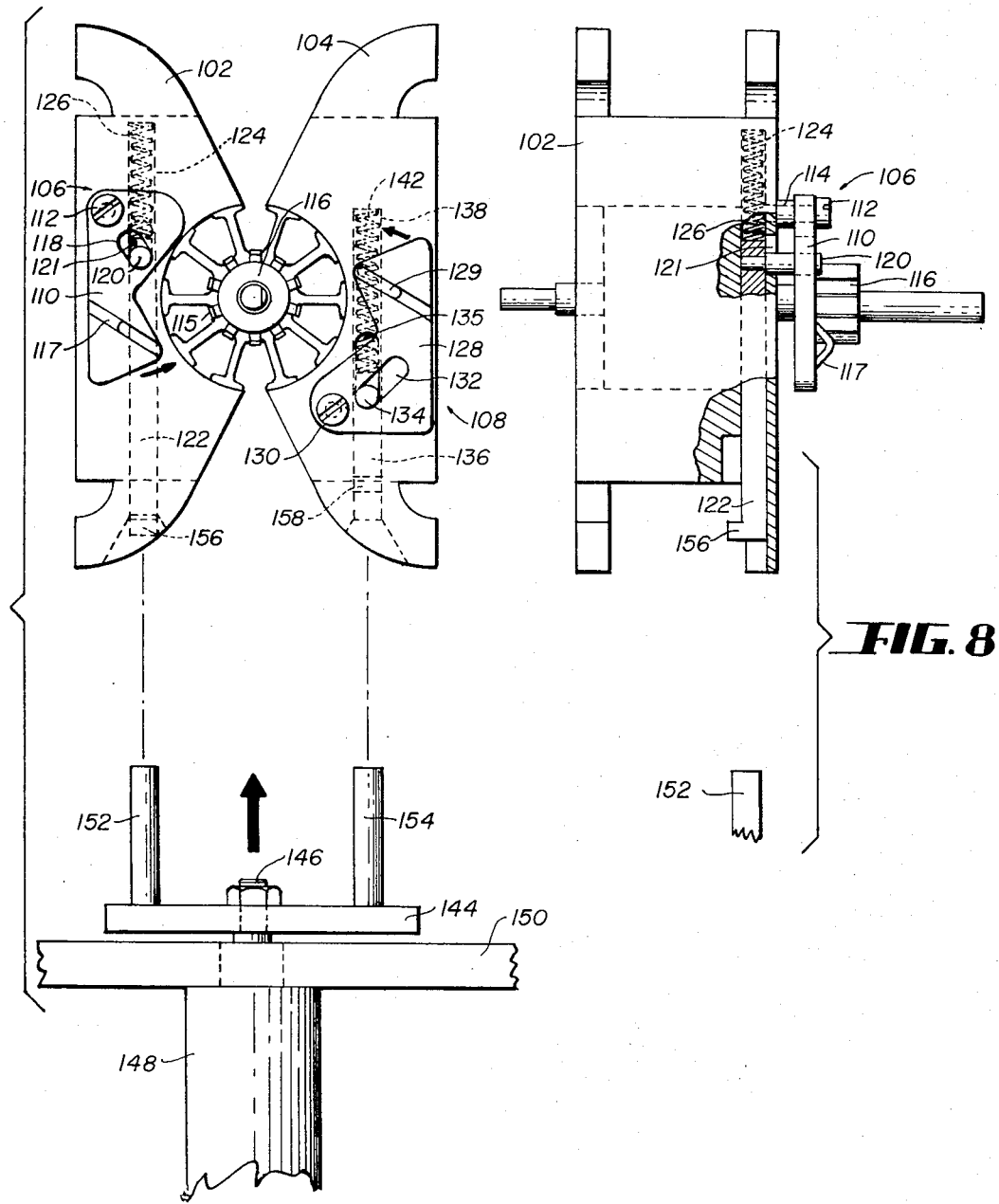

WIRE GUIDE APPARATUS

BACKGROUND OF THE INVENTION

This invention relates to wire guide apparatus and more particularly to wire guide apparatus for use in automatic armature winding machines.

Double flier automatic armature winding machines have been developed for winding coils of wire into radially directed coil receiving slots and for automatically looping lead wires between coils about commutator tangs or hooks. An example of such automatic armature winding apparatus is shown in U. S. Pat. No. 3,506,864. The commutator hooks are covered by shield devices that, during the winding of the coils, cover the commutator hooks. At the proper times during the winding operation, the hooks are exposed and the fliers are rotated in a direction opposite to the direction of rotation when winding coils to extend the wires from the last coils wound about a pair of the hooks. The hooks are again shielded and the fliers rotated in their original direction to cause the wires to be completely looped about the aforementioned pair of hooks.

For many applications a double flier armature winding machine provided with the shielding devices is fully satisfactory. Occasionally, however, the design of the commutator or the character of the wire, and particularly heavy wire, used in the winding is such that the wires do not invariably extend over the commutator hooks. As a result, some armatures may have to be discarded because not all of the coils are connected to the commutator.

Wire guides have been used in various ways in armature winding machines but there have been no wire guides for solving the problems involved in looping relatively heavy wire about commutator hooks.

SUMMARY OF THE INVENTION

The need exists to improve upon such armature winding machines in a manner to insure that all of the commutator connections are looped during the winding of an armature. This invention provides novel wire guide devices supplemental to the winding forms and the shield devices, which wire guides are directly mounted on the winding forms and which insure that the wire will be positively guided in such a manner as to become hooked on the commutator hooks. Each wire guide device has surfaces for guiding the wire around each side of a hook so that there is no possibility that the wire will accidentally cam or slip off the hook.

Other objects and advantages will become apparent from the following description and the drawings.

BRIEF DESCRIPTION OF THE DRAWINGS

FIG. 1 is a partially exploded perspective view of a portion of a double flier armature winding machine provided with wire guide apparatus of this invention and an armature located between the winding forms. In FIG. 1 the armature is shown wound with a pair of coils and the fliers are in position to commence the looping of lead wires from the coils about a pair of commutator hooks.

FIG. 2 is a perspective view of a portion of the armature and of the apparatus shown in FIG. 1 illustrated in use at a later time in the operation thereof.

FIG. 3 is a cross sectional view of a portion of the apparatus illustrated in FIG. 2 taken along section line 3—3 thereof.

FIG. 4 is a cross sectional view of a portion of the apparatus illustrated in FIG. 2 and taken along section line 4—4 thereof.

FIG. 5 is a cross sectional view of a portion of the apparatus illustrated in FIG. 4 and taken along line 5—5 thereof.

FIG. 6 is a perspective view of a wire guide member forming part of the wire guide apparatus shown in the preceding figures.

FIG. 7 is a front elevational view of a pair of winding forms with a second embodiment of wire guides in accordance with this invention and also showing a portion of power operated drive means for the wire guides.

FIG. 8 is a side elevational view with parts broken away and parts in cross section of the embodiment of FIG. 7. To avoid a confusion of lines, the right side wire guide of FIG. 7 has been omitted in FIG. 8.

DESCRIPTION OF THE PREFERRED EMBODIMENTS

This invention is concerned with the winding of an armature of the type generally designated 10 which includes a radially slotted armature core 12, the slots of which are adapted to receive coils of wire 14 and which is mounted on an armature shaft 16. A commutator 18 is mounted upon the same shaft and has a plurality of segments 20 terminating in tangs or hooks 22. As shown in FIG. 4, the section of the shaft 16 between the core 12 and the commutator 18 is covered by an insulating sleeve 23.

A portion of a double flier winding machine used for winding the armature 10 is shown in FIG. 1 and includes a pair of wire guide wings or winding forms 24 and 26, the armature 10 being supported at least partly by the confronting concavely curved surfaces thereof. The left side winding form 24 is mounted upon a mounting plate 28 which in turn is supported on a bearing housing 30 that rotatably receives a flier spindle 32 on which is affixed a flier 34, only a portion of which can be seen in FIG. 1. The right side winding form 26 is similarly mounted on a mounting plate 36 affixed to a bearing housing 38 rotatably receiving a spindle 40 for a flier 42.

As conventional, wire, designated W, is dereeled from a supply spool (not shown) and coursed through the spindle 40 around a pulley 44 mounted for rotation thereon and another pulley 46 mounted for rotation at the terminal end of the flier 42. Another strand of wire W is similarly threaded onto the flier 34. As well known to those skilled in the art, the fliers 34 and 42 may be rotated to wind the coils 14, two at a time, in spaced slots of the core 12. Appropriate machine control devices (not shown) are provided for spreading the winding forms 24 and 26 when inserting the armature 10 in place and for removing it therefrom, for rotating the fliers 34 and 42 in proper timed sequence, and for indexing or rotating the armature 10 as required to present new pairs of slots in the position to receive coils wound by the fliers.

During the intervals in which the fliers 34 and 42 are rotating to wind coils, it is necessary to shield the hooks 22 so that the wires are not accidentally hooked thereover. For this purpose a hollow, cylindrical shield 48 is illustrated which, in use, surrounds an end of the shaft 16 and the commutator 18. The shield 48 has a pair of diametrically opposed notches 50 adapted to expose a pair of the hooks 22. The shield 48 may be mounted for rotation about the axis of the armature shaft 16 so that the notches 50 are located in a generally vertical plane, the shield 48 thus covering all of the tangs which otherwise might be in the path of the wire as the coils are wound. When it is desired to extend the wire leads about selected hooks 22 in the manner described below, the shield 48 is rotated to position the notches 50 over a pair of hooks designated 22a and 22b, which, in the illustrated embodiment, lie in a generally horizontal plane, thus exposing these hooks. Of course other shield arrangements could be used provided that, at the proper time, they expose the two hooks about which the wire is to be looped and cover all other hooks lying in the path of the wire portions extending from the fliers to the armature.

In FIG. 1, the fliers 34 and 42 are shown positioned approximately where they would be located at the termination of the winding of a pair of coils. In the setup illustrated, the fliers rotate in a direction opposite to the arrows shown in FIG. 1 to wind the coils. This may be referred to as "right flier—top going." In such circumstances the left flier rotates in a "top coming" direction during the winding of coils. The wire leads between coils are extended about the temporarily exposed commutator hooks 22a and 22b by rotating the fliers through a portion of a revolution in a direction reverse to the direction in which they are rotated when winding coils, that is, in the direction of the arrows shown in FIG. 1. In practice the armature 10 may be indexed or rotated either before or after the reverse rotation of the fliers 34 and 42 and the fliers may undergo other reverse and/or forward movements. For purposes of the description of this invention, it is sufficient to assume that the wires are first extended about the hooks 22 by a single, partial reverse rotation of the fliers 34 and 42, the hooks 22 again being shielded and the fliers again rotated in the forward direction to complete the looping of the wire thereabout. Because the hooks are shielded during the flier forward rotation (after the reverse rotation), the wire is caused to cross over the face of the hooks 22 confronting the armature core 12.

Occasionally a wire will cam or slip off the commutator hooks during the reverse rotation of the fliers. In accordance with this invention, apparatus is provided for insuring that the wires will always hook onto the desired hooks 22. The apparatus includes a left hand wire guide device generally designated 52 and a right hand wire guide device generally designated 54.

With reference to FIGS. 3, 4 and 6, the left hand wire guide device 52 includes an inflexible wire guide finger 56, preferably made from steel and consisting of an elongate plate portion 58 having spaced front and rear surfaces, designated 60 and 62, respectively, substantially parallel to the adjacent side face of the winding form 24. The plate portion 58 is supported in spaced relation to the winding form 24 and beside the commutator hooks 22 by a generally rectangular pad portion 64. The plate portion 58 and the pad portion 64 are apertured at 66 to receive a pivot pin 68 pivotally connecting the guide finger 56 to the adjacent side face of the winding form 24. The edge of the plate portion 58 closest to the commutator 18 is arcuately curved and has a convex wire guide surface portion 70 for guiding the wire toward the confronting surface of the commutator 18. The pivotal mounting of the finger 56 is such that the wire guide surface portion 70 is movable perpendicularly to the longitudinal axis of the armature shaft 16 and toward and away from the commutator 18.

A notch 72 is cut in the guide surface portion 70 and the rear surface 62 for receiving the commutator hook 22a. The end of the notch 72 opening on the guide surface portion 70 is defined by spaced, parallel edges 74 and 76 that are perpendicular to the front and rear surfaces 60 and 62. These edges 74 and 76 are essentially horizontal when the finger 56 abuts the commutator 18 and effectively straddle the hook 22a, or at least the horizontal extensions of the hook 22a, and lie sufficiently close to the commutator 18 that, upon rotation of the flier 34 in the reverse direction, the wire is guided first along the arcuate guide surface portion 70, then across the edges 74 and 76 whereupon the wire is forced to a position closely adjacent the commutator 18 and into the bight portion of the hook 22a. Because of the location of the edges 74 and 76, the wire is not free to cam or slide off the sides of the hook 22a during the flier's reverse rotation.

The left side wire guide device 52 further includes a spiral spring 78 having one end attached to a pin 80 affixed to the finger 56 and the other end attached to a pin 82 affixed to the winding form 24. The construction is such that the finger 56 is mounted on the winding form 24 for a pivotal movement about an axis parallel to but spaced to the side and beneath the armature shaft 16, and the spring 78 biases the finger 56 in a clockwise direction as viewed in FIG. 3, thus urging the guide surface 70 toward the commutator 18.

The right side wire guide device 54 includes a finger 84 constructed identically to the finger 56 and having a notch or cavity 86 for receiving the hook 22b, the cavity 86 being defined by sidewalls terminating in horizontal edges 88 and 90 on an arcuate guide surface 92 for guiding the wire on both sides of the hook 22b. As apparent from FIGS. 1–3, the finger 84 is mounted by a pivot pin 94 upon the side face of the right hand winding form 26 for pivotal movement about an axis which is parallel to and above the armature shaft 16. A spiral spring 96 coacts between the winding form 26 and the right hand wire guide finger 84 causing its wire guide surface 92 to be biased toward the commutator 18.

Also shown in the drawing are loops or partial loops of wire, there being one loop 98 on the front face 60 of the finger 56 and a similar loop 100 on the front face of the finger 84. These loops 98 and 100 also perform a wire guiding function. For example, the loop 98 cooperates with the surface 70 to guide the wire toward the commutator 18. The loops 98 and 100 would not be required in all cases and they could be replaced by solid pieces of metal or the like for cooperating with the wire guide surfaces on the main body of the fingers 56 and 84.

In operation the shield 48 is rotated to a position 90 degrees from that shown in the drawing whereupon the tangs 22 in the paths of wires during the winding of the coils 14 are shielded. After a pair of coils is completely wound, the fliers are stopped at approximately the positions illustrated in FIG. 1 and the shield 48 rotated to the position shown in the drawing to expose the hooks 22a and 22b. At the same time the guiding ends of the guide fingers 56 and 84 are advanced toward the commutator 18 to the position illustrated in FIGS. 2-5, whereupon the hooks 22a and 22b are partially enclosed by the notches 72 and 86. The fliers 34 and 42 are then rotated in the reverse direction, that is, the direction indicated by the arrows in FIG. 1, whereupon the wires associated therewith are cammed by the guide surfaces 70 and 92 toward the commutator 18 and ultimately between the commutator 18 and the edges which define the sides of the notches 72 and 86. Accordingly, the wires are accurately guided to locations whereat they must be hooked about the hooks 22a and 22b. The reverse rotation of the fliers 34 and 42 may be on the order of 90° but in any case sufficient to cause the wires W to traverse completely across the bight portions of the hooks 22a and 22b. The wires are now located approximately as illustrated in FIGS. 4 and 5. Thereafter the shield 48 is rotated back to its initial position so that it provides a shield over the hooks 22a and 22b. Such rotation is accompanied by a camming of the fingers 56 and 84 away from the commutator 18 by the surfaces of the shield 48 adjacent the notches 50. After the hooks 22a and 22b are again shielded, the fliers are then rotated in the forward direction, that is, opposite to the direction of rotation indicated by the arrows in FIG. 1, to cause the wires to be completely looped about the hooks 22a and 22b. The looping of the lead wires about the hooks 22a and 22 is thus finished and additional coils 14 may then be wound.

Using the springs 78 and 96 as means for powering the wire guide fingers 56 and 84, it will be observed that the fingers 56 and 84 are in the paths of the wires used in winding the coils. This usually presents no problem since, upon each pass of the wires between the shield 48 and the fingers 56 and 84, the fingers are merely cammed away from the shield 48 by the wires themselves.

FIGS. 7 and 8 show a portion of a double flier armature winding machine including a left side winding form or wire guide wing 102 and a right side winding form or wire guide wing 104 provided respectively with a left side wire guide 106 and a right side wire guide 108 of a second embodiment of this invention. The wire guide device 106 includes a wire guide finger 110 pivoted by a pin 112 to the front face of the left side winding form 102. The finger 110 is spaced from the left side winding form 102 by a spacer sleeve 114 surrounding the pin 112. The finger 110 is constructed similarly to the fingers 56 and 84 and includes a cavity or notch (not shown) for straddling a commutator hook 115 of a commutator 116 and a metal loop 117 to assist in guiding wire to the area of the cavity and around the commutator hook.

In FIGS. 7 and 8 the wire guide finger 110 has an oval slot 118 in the body thereof receiving a drive pin 120 extending through a vertical slot 121 in the adjacent face of the form 102 and mounted upon a drive rod 122 which is slidably mounted for vertical movement in an elongate hole or groove 124 formed in the body of the winding form 102. A return spring 126 is confined within the upper end of the hole 124 and coacts between the upper wall of the hole or groove 124 and the top end of the drive rod 122. The spring 126 is prestressed to bias the drive member 122 downwardly in its hole 124 and, because of the motion transmission provided by the pin 120 acting in the slot 118, the finger 110 is positioned by the spring 126. The finger 110 normally occupies the position shown in FIG. 7 with the guiding end of the finger 110 pivoted away from the commutator 116.

The wire guide device 108 includes a wire guide finger 128 with a wire guide loop 129 of substantially the same construction as the finger 110 and pivoted by a pin 130 to the right side winding form 104 from which it is spaced by a sleeve (not shown) similar to the sleeve 114. A slot 132 is formed in the body of the finger 128 for receiving a drive pin 134 vertically movable in a slot 135 in the form 104 and affixed to a drive member 136 slidably mounted in a groove or hole 138 in the right side winding form 104. A return spring 142 acting against the upper end wall of the hole 138 and the drive rod 136 normally biases the drive member 136 downwardly, which causes the wire guide finger 128 to normally occupy a position remote from the area of the commutator 116.

When it is desired to move the wire guide fingers 110 and 128 into shielding and guiding relation with a pair of commutator hooks, the drive members 122 and 136 are moved upwardly, thereby causing the wire guide fingers 110 and 128 to be rotated in counterclockwise directions about their pivot pins 112 and 130, respectively. For this purpose, a power operated drive is provided which may consist of a drive plate 144 mounted on the upper end of a piston rod 146 of an air actuator 148 that is affixed in any suitable fashion to a plate 150 located beneath the winding forms 102 and 104 and which in turn is fixed in relation to the bed of the machine. Affixed to the sides of the drive plate 144 are drive fingers 152 and 154 which are vertically aligned with flanges 156 and 158, respectively, connected to or integral with the slidable drive members 122 and 136. As apparent, the actuator 148 can be energized to extend its piston rod 146, thereby causing the drive fingers 152 and 154 to move upwardly and, accordingly, causing the drive members 122 and 136 to move upwardly, whereupon the wire guide fingers 110 and 128 are pivoted in counterclockwise directions to advance their guide surfaces toward the commutator 116. After the wires are guided about the commutator hooks in the manner described above in connection with FIGS. 1-6, the actuator 148 would be energized to retract its piston 146 whereupon the return springs 126 and 142 would cause the wire guide fingers 110 and 128 to return to their normal positions shown in FIGS. 7 and 8.

Those familiar with armature winding machines will recognize that the drive plate 144 with its fingers 152 and 154 must be moved away from the area of the winding forms 102 and 104 during the winding of coils because otherwise it would obstruct the movement of the fliers. They will also recognize that the method and apparatus for positively driving the fingers 110 and 128 is quite similar to commonly used "stingers" which power pawls or the like for indexing armatures. Of course the movements of the fingers would be automatically timed by the machine controls, details of which could be entirely conventional and hence are not described herein.

Although more expensive, the second embodiment of the wire guide devices is preferred for use in machines in which it may be necessary, for one reason or another, to remove the wire guide fingers from the commutator except when they are required to guide the wires about the commutator hooks. Also the second embodiment is preferred for use with very heavy wire which might overcome the spring biased fingers disclosed in the first embodiment and thus not be guided thereby.

Although the presently preferred embodiments of this invention have been described, it will be understood that within the purview of this invention various changes may be made within the scope of the appended claims.

Having thus described our invention, we claim:

1. An improvement in an armature winding machine of the type having means for supporting an armature to be wound, the armature including a slotted core, a commutator having wire lead receiving hooks, the core and the commutator being mounted on a common shaft, a flier for winding wire, a winding form for guiding wire wound by the flier into pairs of spaced slots in said core, a shield for shielding commutator hooks in the path of the wire being wound into coils, and means for exposing a selected commutator hook after the winding of each coil, wherein the improvement comprises:

A. a wire guide member having a notch for receiving a portion of said selected hook and bounded in part by two wire guide surfaces on opposite sides of said notch for guiding a wire toward said commutator and around said selected hook, B. means mounting said wire guide on said winding form for movement from a first position whereat said guide surfaces are remote from said commutator, thereby to permit wire to pass between said guide surfaces and said shield while coils are being wound, to a second position whereat said guide surfaces are located sufficiently close to said commutator to cause the section of wire to be engaged with said selected hook to be biased toward said commutator and around said selected hook during the interval in which the flier is rotated to engage the wire with said selected hook, and C. drive means for moving said wire guide member to said second position when said selected hook is exposed.

2. The improvement of claim 1 wherein said wire guide member is pivotally mounted on said winding form.

3. The improvement of claim 1 wherein said drive means comprises a spring connected between parts fixed in relation to said wire guide member and said winding form respectively, said spring being constructed and arranged to move said notched portion of said wire guide member toward said commutator when said selected hook is exposed.

4. The improvement of claim 1 wherein said wire guide member is pivotally mounted on said winding form and said drive means comprises a spring connected between parts fixed in relation to said wire guide member and said winding form respectively, said spring being constructed and arranged to move said notched portion of said wire guide member toward said commutator when said selected hook is exposed.

5. The improvement of claim 1 wherein said drive means includes a drive member movably mounted in said winding form and power operated means positioned remote from said winding form during the winding of coils and moved into operative engagement with said drive member to cause said wire guide means to be moved toward said commutator.

* * * * *